Figure 1:
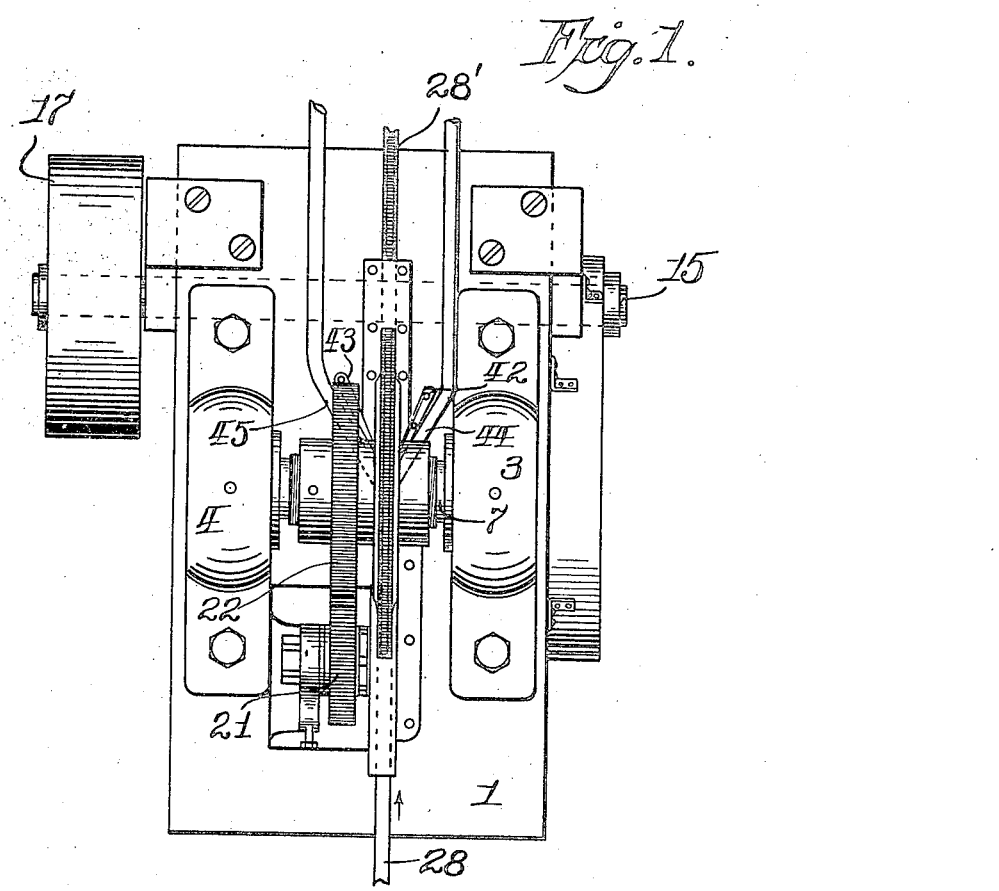

Jan. 16, 1923.
1,442,554

F. W. ADSIT.
MACHINE FOR FORMING STORAGE BATTERY GRID ELEMENTS.
FILED SEPT. 15, 1919.

4 SHEETS-SHEET 1

Inventor:
FRANK W ADSIT
By C. D. Enochs
Attorney.

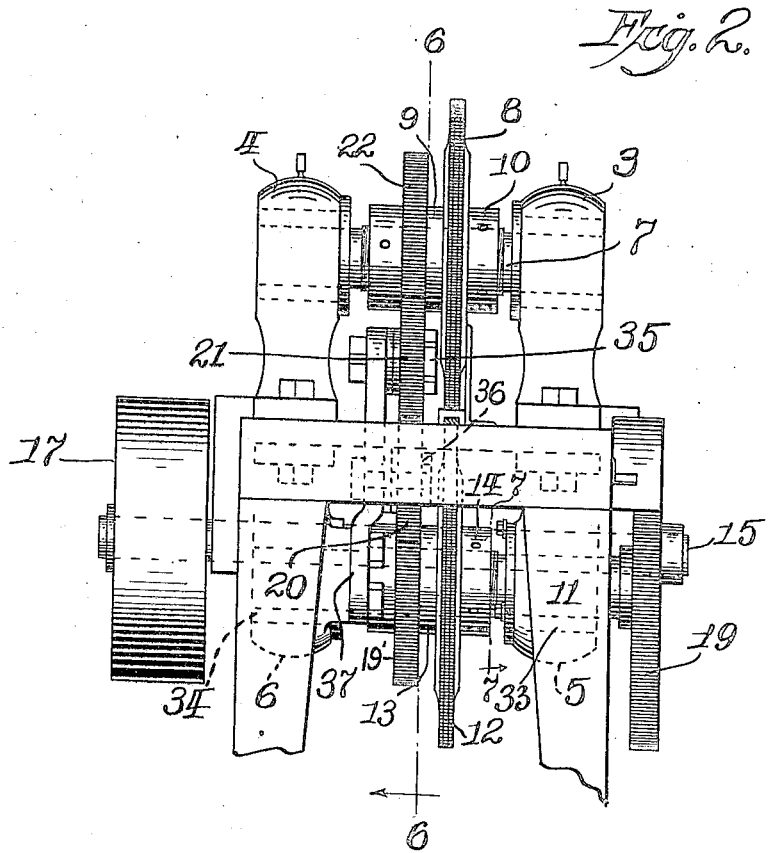

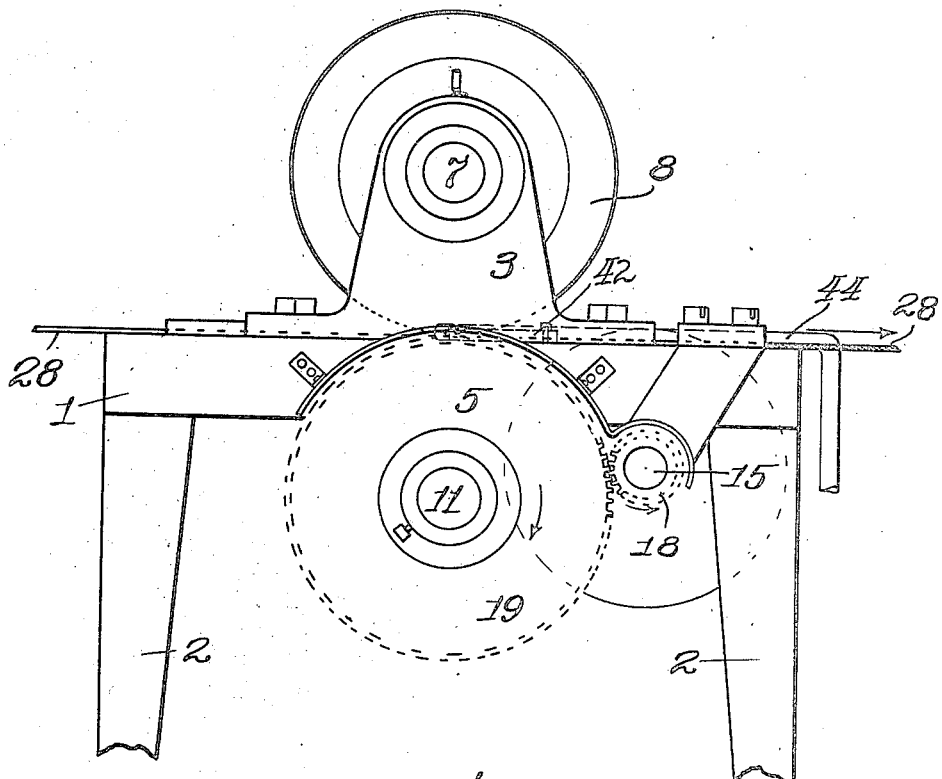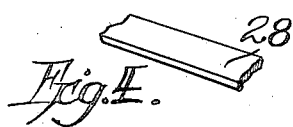

Jan. 16, 1923.
F. W. ADSIT.
MACHINE FOR FORMING STORAGE BATTERY GRID ELEMENTS.
FILED SEPT. 15, 1919.
1,442,554
4 SHEETS-SHEET 4
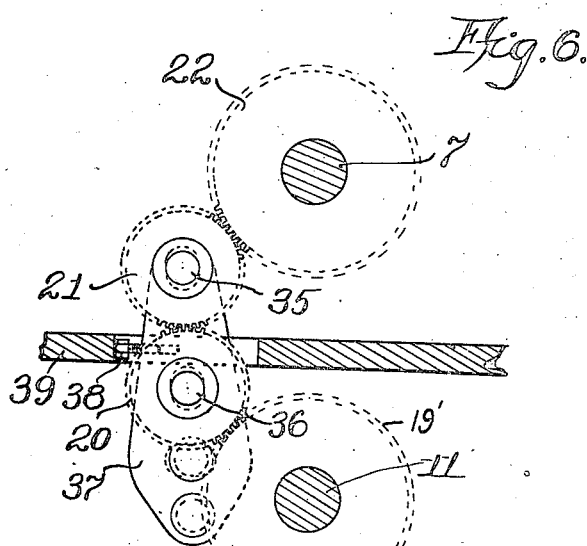
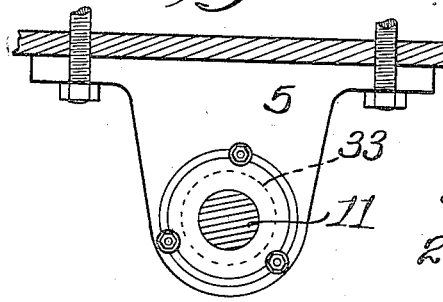
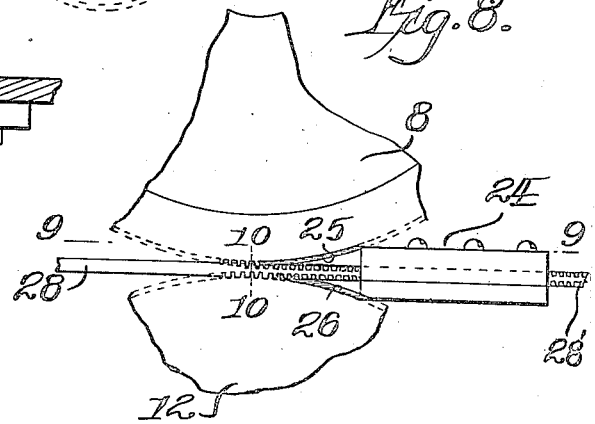
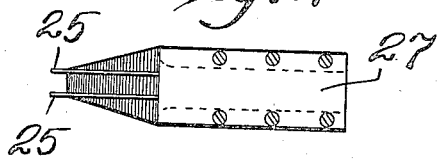
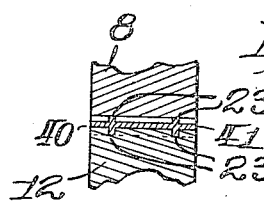
Inventor:
FRANK W ADSIT
by C. B. Enochs
Attorney.

Patented Jan. 16, 1923.

1,442,554

UNITED STATES PATENT OFFICE.

FRANK W. ADSIT, OF ST. PAUL, MINNESOTA, ASSIGNOR TO AMERICAN DEVELOPMENT COMPANY, OF MINNEAPOLIS, MINNESOTA, A CORPORATION OF SOUTH DAKOTA.

MACHINE FOR FORMING STORAGE-BATTERY GRID ELEMENTS.

Application filed September 15, 1919. Serial No. 323,976.

*To all whom it may concern:*

Be it known that I, FRANK W. ADSIT, a citizen of the United States, and a resident of St. Paul, in the county of Ramsey and State of Minnesota, have invented certain new and useful Improvements in Machines for Forming Storage-Battery Grid Elements, of which the following is a specification.

One object of my invention is to provide, in a machine of the class described, improved means for crimping a lead ribbon and, at the same time, throwing up a longitudinal rib from the material from which the ribbon is formed.

Another object of my invention is to provide improved means for stripping a lead ribbon from the forming means after the ribbon has been crimped.

Another object of my invention is to provide means for stripping or shearing off the rough edges of the formed ribbon and removing the waste lead so stripped from the machine.

Other objects of my invention are to provide various adjustable features for the machine.

In the drawings, Fig. 1 is a plan view of my machine. Fig. 2 is an end view of the same, with portions of the supporting legs broken away. Fig. 3 is a side elevation of the machine as shown in Fig. 2. Fig. 4 is an enlarged perspective detail of the lead ribbon used in the machine before it passes through the forming means. Fig. 5 is a similar view of the ribbon after it has passed the forming means. Fig. 6 is a section taken on the line 6—6, Fig. 2. Fig. 7 is a section taken on the line 7—7, Fig. 2. Fig. 8 is a fragmentary detail showing the manner in which the stripping knives lift the formed ribbon from the forming rolls. Fig. 9 is a view of the stripper, taken on the line 9—9, Fig. 8, and Fig. 10 is an enlarged sectional view taken on the line 10—10, Fig. 8.

My improved machine consists primarily of a table base 1, Fig. 3, supported by legs 2, and having journal supports 3 and 4 carried above the table, and journal supports 5 and 6 carried below the table.

Journalled in the supports 3 and 4 is a shaft 7 to which is rigidly fastened a forming wheel 8, the wheel being clamped to the shoulder 9 by the nut 10.

Similarly, the bearing supports 5 and 6 have journalled therein a shaft 11, on which is carried the forming wheel 12, held against the collar 13 by the nut 14.

Journalled in a support carried by the table is a shaft 15, to which is keyed, or otherwise suitably fastened, a pulley 17 which is utilized to drive the machine.

A pinion 18 is driven by the shaft 15 and meshes with the gear 19 mounted on the driving shaft 11, and the gear 19' also driven by the shaft 11 meshes with and drives the idle gear 20, Fig. 6, meshing with and driving the idle gear 21, which, in turn, drives the gear 22 carried by and driving the shaft 7.

It is evident that the turning of the pulley 17 will therefore drive the forming wheels 8 and 12, the forming wheel 8 rotating in a counterclockwise direction, as shown in Fig. 3, and the forming wheel 12 rotating in a clockwise direction.

The reduction from the pinion 18 to the gear 19 allows the exertion of a heavy torque on the forming wheels, and, as the machine is gear driven entirely and the gears are accurately cut and meshed, the travel of the two faces of the forming wheels is, at all times, in unison, one with the other, so any material passed through the forming means will be uniformly acted upon by the wheels.

Looking at Figs. 8 and 10, it will be seen that each of the wheels 8 and 12 have the faces thereof cut somewhat in the manner of a fine pitched gear, although these wheels are so spaced that these teeth do not mesh one with the other.

Looking especially at Fig. 10, it will be seen that each of the wheels 8 and 12 have annular grooves 23 therein, these grooves connecting the transverse grooves between the tooth-like projections.

A stripper 24, Fig. 8, comprises four blades 25 and 26 and a box-like structure, in which the blades 25 and 26 are mounted so as to leave through the box-like structure a passageway 27, through which the ribbon may pass.

It will be seen that the blades 25 rest in the grooves 23 of the upper forming wheel, while the blades 26 rest in the grooves of the forming wheel 12.

When the lead ribbon 28 is led into the machine from the roll, or any other suitable means, and passed through the forming wheels 8 and 12, it is formed into the shape shown in Fig. 5, the ribbon on leaving appearing as indicated by 28', Fig. 8.

The transverse ribs 29 are caused by the metal of the ribbon being forced upwardly into the transverse grooves in the forming wheel 8, while the transverse ribs 30 are formed by the metal of the ribbon being forced downwardly into the transverse grooves of the forming wheel 12, and the upper ribs 31 are formed by the forcing of the metal into the grooves 23 of the upper wheel 8, while the lower ribs 32 are formed from the metal that is forced into the grooves 23 of the lower wheel 12.

The distance between the faces of the forming wheels, the thickness of the metal, and the pressure is such that the metal forming the lead ribbon 28 actually flows into the spaces as described, so the formed ribbon 28' is a homogenous mass with the longitudinal ribs and the transverse ribs of continuous metal and not merely upstanding ribs formed independently and lying close, one to another, in mechanical contact.

Looking now at the blades 25 and 26, it will be seen that the formed ribbon is stripped from the forming wheels by the action of these blades on the formed ribs 31 and 32.

In practice the formed ribbon may adhere to either wheel 8 or 12 after the form has been set.

If the ribbon starts to be carried by the wheel 8, it will be stripped by the blades 25, and the ribbon will continue to be stripped by the blades 25 so long as the machine is in continuous operation.

On the other hand, if the ribbon starts to be carried by the wheel 12, it will be stripped therefrom by the blades 26 so long as the machine is in continuous operation. In either event, it will be passed through the passageway 27 in its completed form.

In order to make the metal flow readily into the grooves, I prefer to oil the lead before it reaches the forming rolls.

Looking at Fig. 7, it will be seen that the shaft 11, which is carried by the journal supports 5 and 6, is mounted therein by eccentric or offset bearings 33 and 34, respectively, so the shaft 11, and through it the forming wheel 12, may be adjusted vertically to increase or diminish the distance between the forming corrugations of the wheels 8 and 12.

Looking at Figs. 2 and 6, it will be seen that the idle gears 20 and 21 are journalled on stub shafts 36 and 35, and, with these shafts, are carried in the swingable arm 37, the apertures in which the stub shafts are mounted in the swingable arm 37 being slightly elongated to allow an adjustment of these shafts in the swingable arm, suitable lock nuts being provided to clamp the stub shafts rigidly in the swingable arm at the position at which they are set, and the swingable arm carries a stud or set screw 38, which striking against the frame member 39, Fig. 6, prevents the idle pinions from coming out of mesh with their respective gears.

It will be readily seen that the adjustment just described is necessary to offset the adjustment heretofore described for the shaft 11.

When the ribbon 28 is formed in the forming wheels 8 and 12, a certain amount of ribbon is squeezed laterally toward the points 40 and 41, Fig. 10, as a sufficient amount of lead must be supplied in the ribbon to thoroughly fill the grooves, and as this cannot be absolutely gauged, it is necessary, in order to be sure that the grooves will be filled, to provide an excess of material in the ribbon 28.

Hence, when the ribbon has been formed, knives 42 and 43 Fig. 1, are set to trim the ribbon at the edges of the wheels 8 and 12, so the completed ribbon, as trimmed, will be of the same width as the faces of the forming wheels.

Tubes 44 and 45, positioned adjacent to the knives 42 and 43, receive the small lead strip thus trimmed from the formed ribbon, and this waste metal passes out through these tubes and is deposited at the base of the machine, in suitable receptacles, if desired, while the formed ribbon is preferably wound onto a reel as fast as it is delivered by the machine.

While I have described my invention and illustrated it in one particular design, I do not wish it understood that I limit myself to this construction, as it is evident that the application of the invention may be varied in many ways within the scope of the following claim.

I claim:

In a machine for forming a storage battery grid element the combination of forming means for crimping a lead ribbon into a shape having transverse bars and longitudinal bars, shearing knives positioned adjacent to said forming means for shearing the excess metal from said formed ribbon, and a tube positioned adjacent to each of said knives for leading therefrom the waste material sheared from said ribbons by said knives.

FRANK W. ADSIT.